(12) United States Patent
Schmid et al.

(10) Patent No.: US 12,021,430 B2
(45) Date of Patent: Jun. 25, 2024

(54) ELECTRIC MOTOR HAVING COMPACT BUSBAR UNIT

(71) Applicant: Nidec Corporation, Kyoto (JP)

(72) Inventors: Jürgen Schmid, Brackenheim (DE); Thomas Kübler, Untergruppenbach (DE)

(73) Assignee: NIDEC CORPORATION, Kyoto (JP)

( * ) Notice: Subject to any disclaimer, the term of this patent is extended or adjusted under 35 U.S.C. 154(b) by 246 days.

(21) Appl. No.: 17/786,930

(22) PCT Filed: Dec. 9, 2020

(86) PCT No.: PCT/IB2020/061669
§ 371 (c)(1),
(2) Date: Jun. 17, 2022

(87) PCT Pub. No.: WO2021/124020
PCT Pub. Date: Jun. 24, 2021

(65) Prior Publication Data
US 2023/0019294 A1    Jan. 19, 2023

(30) Foreign Application Priority Data
Dec. 18, 2019    (DE) .......................... 102019134935.4

(51) Int. Cl.
*H02K 3/50* (2006.01)
*H02K 3/52* (2006.01)
*H02K 5/22* (2006.01)

(52) U.S. Cl.
CPC .............. *H02K 3/522* (2013.01); *H02K 3/50* (2013.01); *H02K 5/225* (2013.01); *H02K 2203/09* (2013.01)

(58) Field of Classification Search
CPC .......... H02K 3/522; H02K 3/50; H02K 5/225; H02K 2203/09
(Continued)

(56) References Cited

U.S. PATENT DOCUMENTS 10,998,789 B2 *  5/2021  Tategata ................... H02K 3/50
2017/0250588 A1 *  8/2017  Kaiser ...................... H02K 3/50
(Continued)

FOREIGN PATENT DOCUMENTS

DE           101 16 831 A1    10/2002
DE    10 2014 201 637 A1      7/2015
(Continued)

OTHER PUBLICATIONS

Official Communication issued in International Patent Application No. PCT/IB2020/061669, Issued on May 17, 2022.

*Primary Examiner* — Terrance L Kenerly
(74) *Attorney, Agent, or Firm* — Keating & Bennett, LLP

(57) ABSTRACT

An electric motor includes three busbars in contact at end surfaces thereof and including ring-segment-shaped base portions to provide electrical connection of the busbars. The base portion of a first busbar is in a first plane and the base portion of a second busbar is in a second plane. The base portion of the first busbar extends clockwise from the terminal of the first busbar and the base portion of the second busbar extends counterclockwise from the terminal of the second busbar. Terminals of the first and second busbars are spaced apart with the terminal of the third busbar between the first and third terminals. The third busbar includes a first region extending clockwise from its terminal and lying in the second plane and a second region extending counterclockwise from its terminal and lying in the first plane.

10 Claims, 4 Drawing Sheets

(58) Field of Classification Search
USPC .......................................................... 310/71
See application file for complete search history.

(56) References Cited

U.S. PATENT DOCUMENTS

| | | |
|---|---|---|
| 2018/0097416 A1 | 4/2018 | Dang |
| 2018/0262075 A1 | 9/2018 | Csoti et al. |
| 2020/0106319 A1 | 4/2020 | Tategata et al. |
| 2023/0006494 A1* | 1/2023 | D'Amico ................. H02K 3/50 |

FOREIGN PATENT DOCUMENTS

| | | |
|---|---|---|
| DE | 10 2015 200 093 A1 | 7/2016 |
| DE | 20 2016 106 633 U1 | 1/2017 |
| DE | 10 2016 123 479 A1 | 6/2018 |
| DE | 10 2017 101 073 A1 | 7/2018 |
| DE | 10 2018 126 776 A1 | 4/2020 |
| JP | 2014-158421 A | 8/2014 |

* cited by examiner

ELECTRIC MOTOR HAVING COMPACT BUSBAR UNIT

CROSS REFERENCE TO RELATED APPLICATION

This is a U.S. national stage of PCT Application No. PCT/IB2020/061669, filed on Dec. 9, 2020, and with priority under 35 U.S.C. § 119(a) and 35 U.S.C. § 365(b) being claimed from German Application No. 10 2019 134 935.4, filed on Dec. 18, 2019, the entire contents of which are hereby incorporated herein by reference.

FIELD OF THE INVENTION

The present disclosure relates to an electric motor.

BACKGROUND

Brushless DC motors of the type relevant here are referred to as internal rotor motors and have a rotor which is connected to a motor shaft and is rotatably mounted in a housing. The rotor is provided with permanent magnets. A stator is arranged around the motor, which carries a number of windings on an iron core. When suitably controlled, the windings generate a magnetic field that drives the rotor to rotate. The windings are usually wound in three phases and are accordingly provided with three electrical connections through which the windings can be connected to a control unit (ECU). At low power levels, the busbars can be designed as conductive busbars. For higher powers, as assumed here, the winding connection wires are contacted via busbars made of copper sheet.

For the purpose of the geometrical description of the electric motor, firstly, the axis of rotation of the motor is assumed to be the central axis and axis of symmetry. The stator is concentric with the axis of rotation and the rotor. The axis of rotation defines an axial direction at the same time. In addition, with respect to the central axis, we speak of a radial direction, which indicates the distance from the central axis, and of a circumferential direction, which is defined tangentially to a certain radius arranged in the radial direction. The connection side of the stator, where the winding wires are connected to the busbar arrangement, is described as the top side of the stator.

In addition to the performance data and weight, the dimensions of the electric motors discussed here are also important, especially if the motors are to be used in motor vehicles. The installation space in motor vehicles is generally limited, and the specifications of the motor vehicle manufacturers must be observed. It is therefore a constant requirement for the design of electric motors, for example, not to exceed a certain axial length in the direction of the center axis. In this context, the performance data required of the electric motor essentially determine the axial length of the stator pack and of the rotor with the electromagnets arranged on it. The busbar unit, which is required for contacting the winding connection wires of the stator, contributes to the axial length.

For example, JP 2014-158421 A discloses an electric motor in which a busbar unit including three busbars is arranged axially above the stator pack and is connected to the winding lead wires. The busbar unit includes a number of busbars arranged in a part of a circle concentric to the center axis. A plurality of busbars are thereby arranged stacked on top of each other in the axial direction. The multiple busbars and the electrical insulation required between them contribute to the axial length of the stator stack, since they are arranged above the winding stacks on the stator.

SUMMARY

Example embodiments of the present disclosure provide electric motors each reducing an axial extension of a stator pack and an overall height of an electric motor in an axial direction.

An electric motor according to an example embodiment of the present disclosure includes a rotor rotatably supported about an axis of rotation and a stator externally surrounding the rotor and including a stator core and coils wound on the stator core. The windings include a winding wire including winding wire end portions electrically contacted with three bus bars at ends thereof to define phases. The three bus bars each include a power source connection terminal to electrically contact the bus bar with a power source and a ring segment-shaped base portion to electrically connect the bus bars with the winding wire end portions. The base portion of a first busbar of the three bus bars is in a first plane perpendicular or substantially perpendicular to the axis of rotation. The base portion of the second busbar is in a second plane perpendicular or substantially perpendicular to the axis of rotation and spaced from the first plane. The base portion of the first bus bar extends clockwise from the power source connection terminal of the first bus bar and the base portion of a second bus bar of the three bus bars extends counterclockwise from the power source connection terminal of the second bus bar. The power source connection terminals of the first bus bar and the second bus bar are spaced apart from each other. The power source connection terminal of a third bus bar of the three bus bars is located circumferentially between the power source connection terminals of the first bus bar and the third bus bar. The third bus bar includes a first portion extending from its power source connection terminal in a clockwise direction and located in the second plane, and a second portion extending from its power source connection terminal in a counterclockwise direction and located in the first plane.

This arrangement of the busbars is particularly compact, as only two levels are required and the axial extension of the busbar holder can thus be kept to a minimum or significantly reduced.

Preferably, the base portions of the first, second and third busbars have the same radius and lie one above the other in the axial direction.

It is advantageous if the busbars are at least partially accommodated in a busbar holder which is attached to the top of the stator. Such an arrangement simplifies assembly.

Preferably, the base portion of the third busbar is completely covered by the first busbar and the second busbar in a plan view. In other words the overlap is outside the power source connection terminal.

In an example embodiment of the present invention, the first region and the second region of the third busbar each extend about 105°, for example.

It is advantageous if the first and second busbars are arranged to overlap at their ends remote from the power source connection in a plan view.

In the example embodiment, it is advantageous if the first and second busbars each have a base portion that extends about 210°, for example.

Preferably, the third busbar includes a step in the base portion in the axial direction. The step is used to switch between the levels.

The power source connection terminal of the first busbar is preferably in the first plane, the power source connection terminal of the second busbar is in the second plane, and the power source connection terminal of the third busbar is in the axial direction between the two planes.

A distance between the two levels provides electrical insulation between the busbars.

The example embodiments of the busbars are advantageous when the stator is wound according to a method including starting from a wire beginning of a winding wire, winding a first stator tooth in a first direction, guiding the winding wire to a second stator tooth immediately following the first stator tooth in a first circumferential direction, and winding the second stator tooth in a second direction opposite to the first direction. The winding pairs are to be supplied with current in such a way that the direction of the current flow through winding pairs opposite each other in the circumferential direction is reversed, so that a north pole and a south pole are opposite each other in the stator in the circumferential direction.

The stator preferably includes evenly spaced stator teeth which project inwards from a stator core and leave a cylindrical inner area free, and which are wound in pairs with a winding wire to define a winding pair.

The first direction and the corresponding winding directions are the same for each pair of windings.

The winding scheme has the advantage that the winding of each pair of teeth is the same and thus different components can be avoided, which in turn saves costs. Furthermore, the risk of an electrical short-circuit between the phases is significantly reduced, since crossing of the wires is avoided.

It is preferred if each pair of windings is wound with a single winding wire. However, it is also possible to wind at least two pairs of windings with a single winding wire to define a coil chain.

In one example embodiment of the present invention, the stator has six pairs of windings, for example.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are explained in more detail below with reference to the drawings.

DETAILED DESCRIPTION

Figure 1:
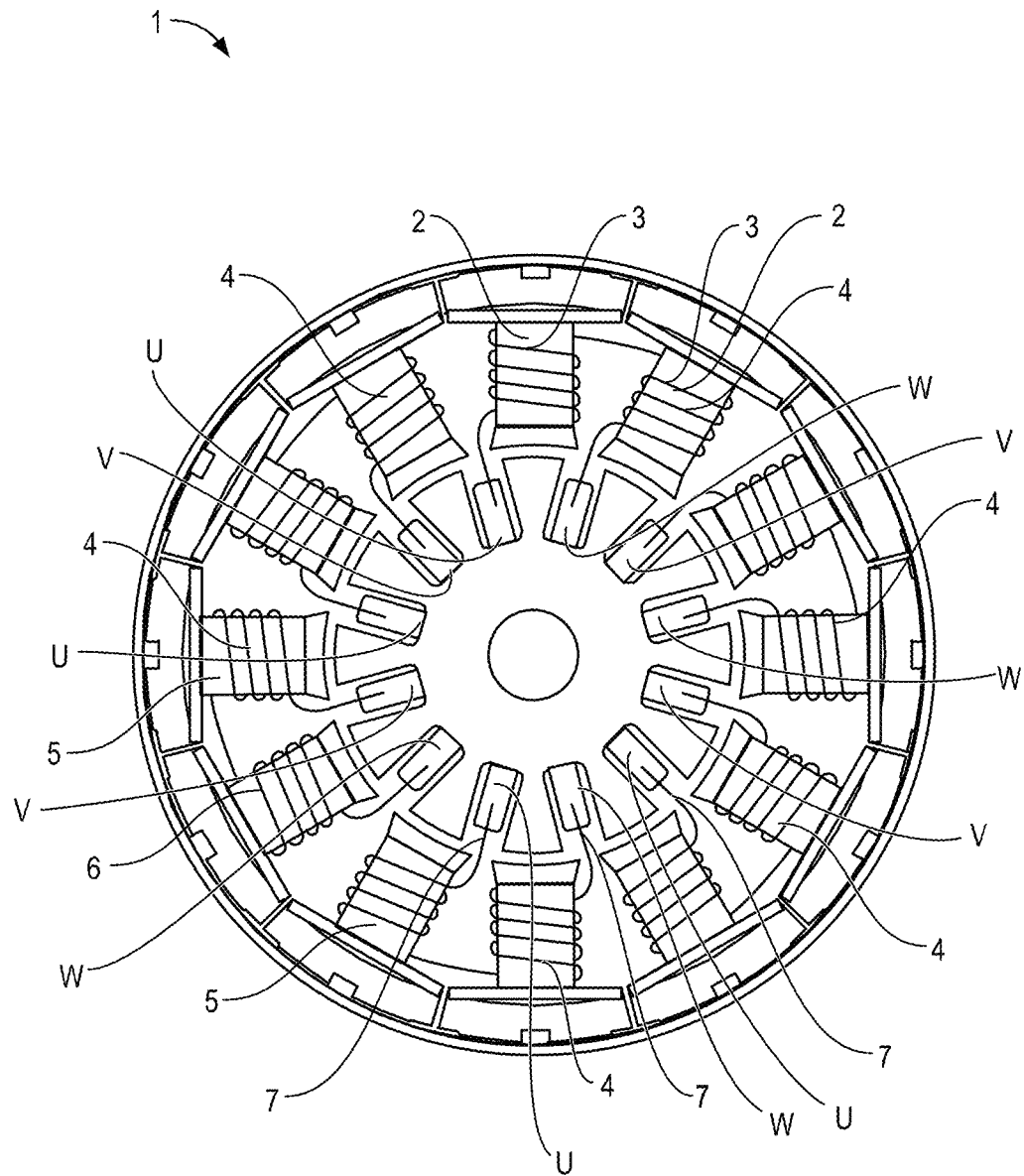
FIG. 1 shows a schematic representation of a stator according to an example embodiment of the present invention in a plan view.

FIG. 1 shows a stator 1 of an electric motor. The stator 1 of the electric motor consists of an iron core and has three phase windings 3 constructed from a plurality of coils 2 on the poles to form a four-pole motor, with the coils 2 wound on the respective poles. Stator teeth extend inwardly from the iron core, leaving a cylindrical inner region within which the rotor of the motor, not shown, rotates during operation. The three phases U,V,W are formed by interconnected pairs of windings 4 so that two parallel current paths are formed in a delta connection. A first coil of each winding pair 4 is formed by winding a tooth counterclockwise. This is followed without interruption by winding a clockwise second tooth of the winding pair 4, which is immediately adjacent to the first tooth. The winding wire ends 7 of the winding pairs 4 are electrically contacted towards the center of the stator. All six winding pairs 4 are wound according to the same scheme. The necessary reversal of the magnetic pole within the winding pair 4 is achieved by an inverted electrical connection and a reversal of the direction of the current flow. The wire ends to be connected to each other are thus at an angle of approximately 150°. The respective contacts of one phase are distributed over a range of approximately 210°.

Figure 2:
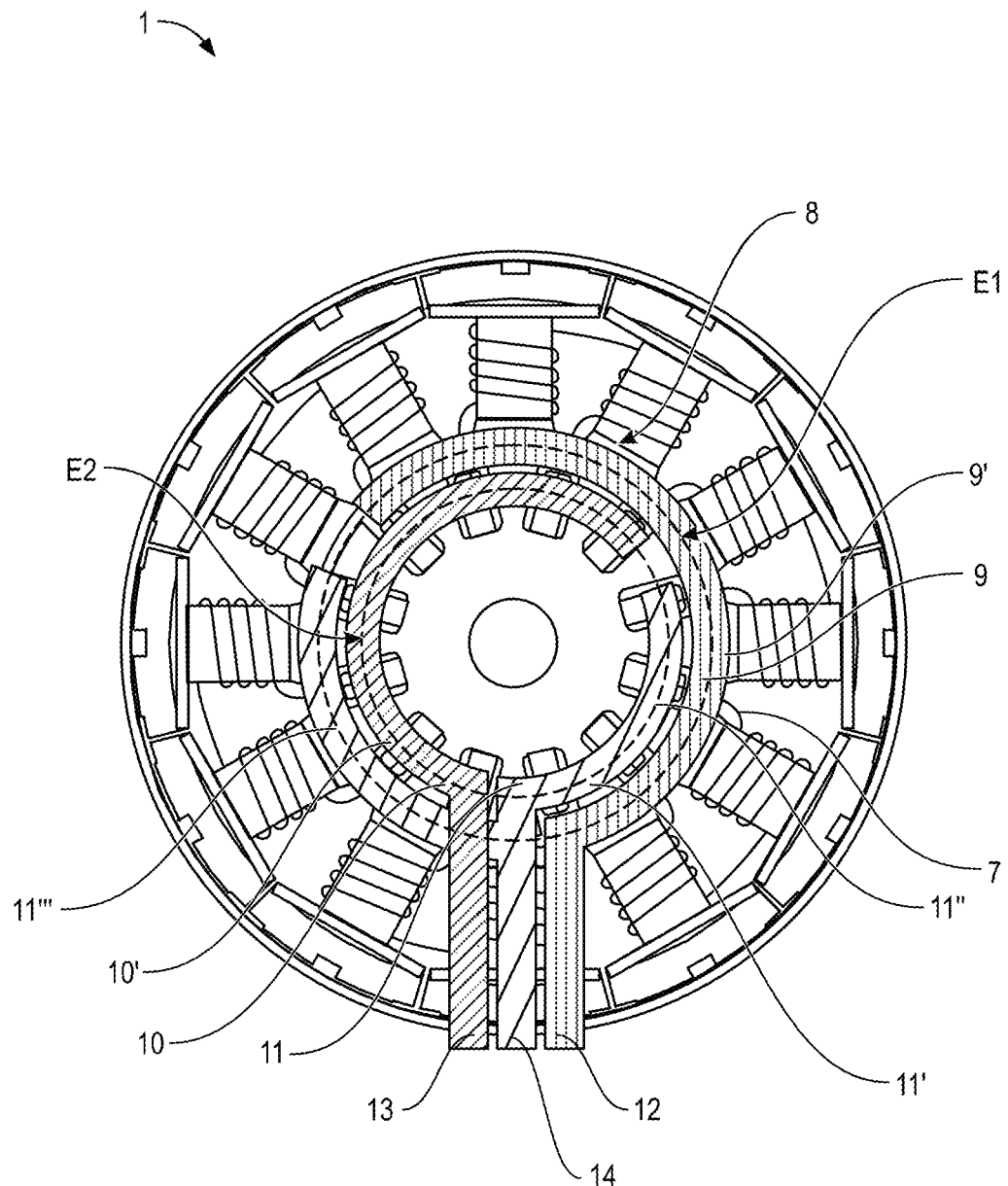
FIG. 2 shows a schematic representation of the stator of FIG. 1 with busbars.

FIG. 2 shows a schematic top view of a busbar unit 8 of the stator 1 shown in FIG. 1. The busbar unit 8 comprises a busbar holder not shown and three busbars 9, 10, 11 mounted on the busbar holder. The busbars 9,10,11 are made of an electrically conductive material, preferably metal, in particular copper. The busbar holder consists at least partly or completely of an electrically insulating material, so that short circuits between the busbars 9,10,11 can be effectively prevented. The busbar holder is preferably produced by injection molding and extends over part of the busbars 9,10,11. In this way, a solid and well-defined physical connection between the busbar holder and the busbars 9,10,11 can be provided. The busbar holder is adapted to be positioned on an axial side of the stator (top side).

The busbar unit 8 is set up to electrically contact the coils 2 of stator 1 by means of busbars 9,10,11. The coils 2 are grouped in the three phase groups U, V, W. Four winding wire end sections 7 each contact a busbar. The busbar of one phase extends over a range of 210°. Each of the busbars 3,4,5 has a power source connection terminal 12,13,14 arranged to electrically connect the busbar to a line source.

The busbars 9,10,11 are each arranged with a base portion 9',10',11' along the circumference with a fixed radius. The base portions 9',10',11' are shaped like ring segments.

In the illustration of FIG. 2, the busbars appear to be on different radii to show the arrangement of the busbars on different planes. This arrangement of the busbars is described below.

A first busbar 9 extends over a range of approximately 210° with its base portion 9' along the circumference. This first busbar lies in a first plane E1. It has the power source connection terminal 12 at one end of the base portion 9'. Starting from the power source connection terminal 12, the base portion 9' extends in a clockwise direction. A second bus bar 10 also extends with its base portion 10' over a range of about 210° along the circumference with the same radius as the first bus bar. The second busbar lies in a second plane E2. It has the power source connection 13 at one end of the base portion 10'. Starting from the power source connection port 13, the base portion 10' extends counterclockwise. In a plan view, the two busbars 9,10 are arranged overlapping at their ends remote from the power source. The two planes E1 and E2 are selected so that the ends overlap in the axial direction but do not touch and are electrically insulated from each other. The two busbars are spaced apart by a in the axial direction.

The third busbar 11 has a power source connection terminal 14 located circumferentially between the terminals 12,13 of the first and second busbars 9,10. All three terminals 12,13,14 are in close proximity to each other. Starting from the third power source connection 14, the third busbar 11 extends in a first area 11" towards the first busbar 9 on the second level E2 and in a second area 11'" towards the second busbar 10 on the first level E1. Thus, in a plan view, the third busbar 11 is arranged in the first area 11" overlapping with the first busbar 9 and in the second area 11'" overlapping with the second busbar 10. Each of the areas 11", 11'" extends in the manner of a ring segment over approximately 105°.

Figure 3:
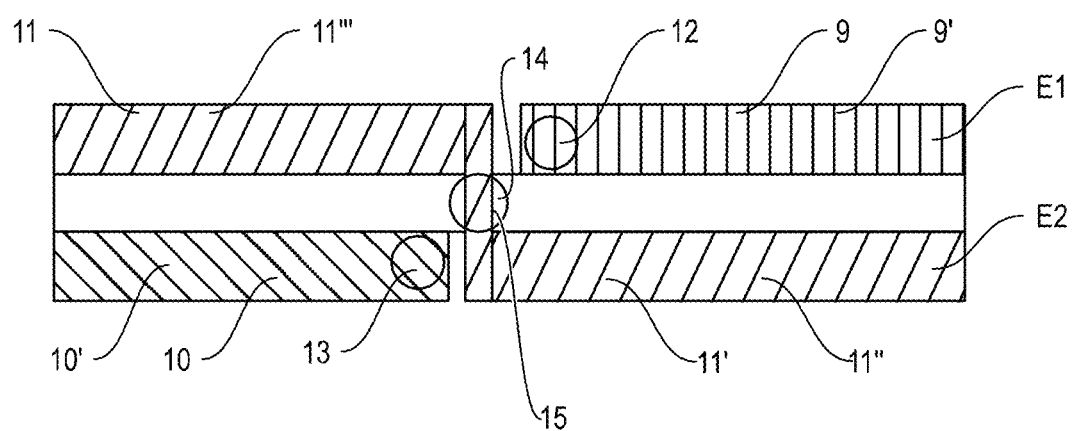
FIG. 3 shows a schematic representation of the power source connections of the three busbars shown in FIG. 2.
Figure 4:
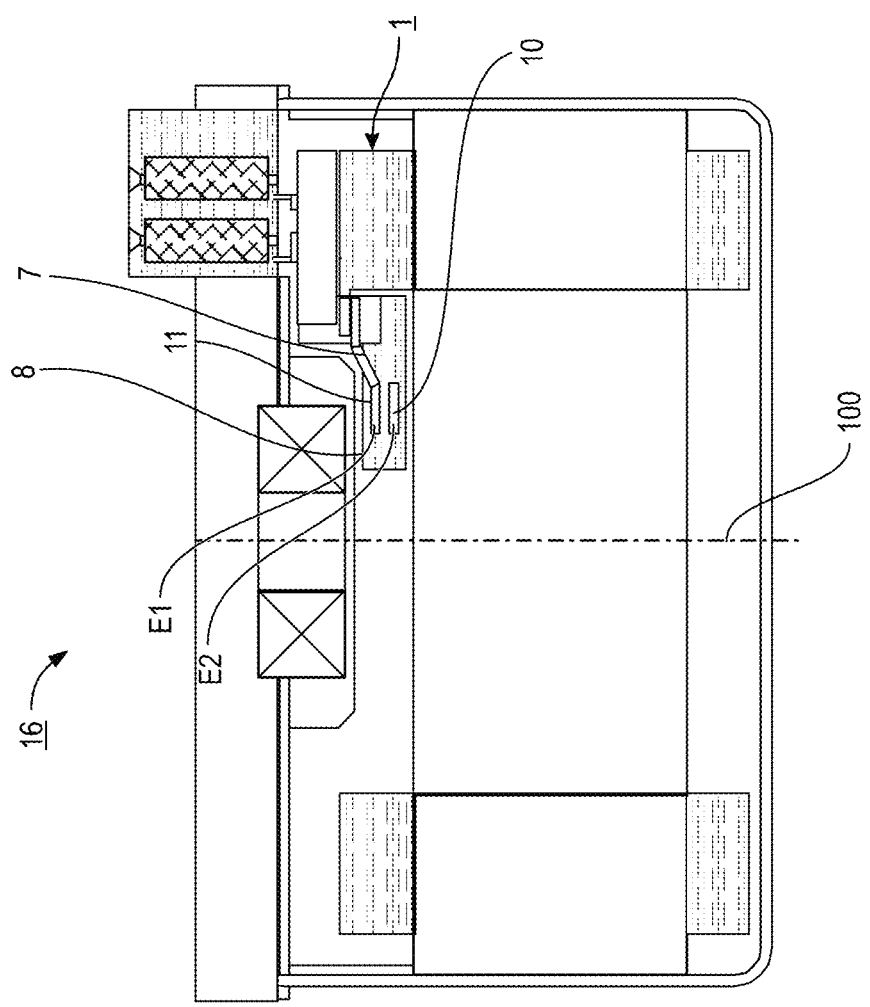
FIG. 4 shows a longitudinal section through a schematically shown electric motor with stator and busbars according to an example embodiment of the present invention.

FIGS. 3 and 4 show the arrangement of the busbars in the axial direction 100. As shown in FIG. 3, the third busbar 11 changes plane halfway along the base portion 11'. The base portion of the third busbar is thus divided between the two sections 11",11'". Thus, the third bus bar 11 has a step 15 in the base portion 11'. The power source connection terminal 12 of the first busbar 9 is located in the first plane E1, the power source connection terminal 13 of the second busbar 10 is located in the second plane E2, and the power source connection terminal 14 of the third busbar 11 is located between the two planes E1,E2 in the axial direction. The three busbars 9,10,11 are distributed over only two planes E1,E2. The axial extent of the stator pack and thus also the overall height of the electric motor in the axial direction are therefore kept to a minimum in order to save installation space.

FIG. 4 schematically shows an electric motor 16 with stator 1, which carries the busbar unit 8 on its end face. The busbars 10,11 lie in two different planes E1,E2. The third busbar 11 is in contact with a winding wire end section 7 of the associated coil.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An electric motor comprising:
a rotor rotatably supported about an axis of rotation; and
a stator externally surrounding the rotor and including a stator core and coils wound on the stator core; wherein
the windings include a winding wire including winding wire end portions;
the winding wire end portions are electrically contacted with three bus bars at ends thereof to define phases;
the three bus bars each include a power source connection terminal to electrically contact the bus bar with a power source and a ring segment-shaped base portion to electrically connect the bus bars with the winding wire end portions;
the base portion of a first busbar of the three bus bars is in a first plane perpendicular or substantially perpendicular to the axis of rotation;
the base portion of the second busbar is in a second plane perpendicular to the axis of rotation and spaced apart from the first plane;
the base portion of the first busbar extends clockwise from the power source connection terminal of the first busbar and the base portion of a second busbar of the three busbars extends counterclockwise from the power source connection terminal of the second busbar;
the power source connection terminals of the first busbar and the second busbar are spaced apart from each other;
the power source connection terminal of a third busbar of the three busbars is circumferentially located between the power source connection terminals of the first busbar and the third busbar;
the third busbar includes a first portion extending clockwise from its power source connection terminal, which lies in the second plane, and a second portion which extends counterclockwise from its power source connection terminal and lies in the first plane.

2. The electric motor according to claim 1, wherein the base portions of the first busbar, the second busbar, and the third busbar have a same radius.

3. The electric motor according to claim 1, wherein the busbars are at least partially accommodated in a busbar holder which is attached to a top of the stator.

4. The electric motor according to claim 1, wherein the base portion of the third busbar is completely or substantially completely covered by the first busbar and the second busbar in a plan view.

5. The electric motor according to claim 1, wherein the first portion and the second portion of the third busbar each extend over about 105°.

6. The electric motor according to claim 1, wherein the first busbar and the second busbar overlap at ends thereof remote from the power source connection terminal in a plan view.

7. The electric motor according to claim 1, wherein the first busbar and the second busbar each include a base portion extending through approximately 210°.

8. The electric motor according to claim 1, wherein the third bus bar includes a shoulder in the base portion extending in an axial direction that is parallel or substantially parallel with the axis of rotation.

9. The electric motor according to claim 8, wherein the power source connection terminal of the first busbar is located in the first plane, the power source connection terminal of the second busbar is located in the second plane, and the power source connection terminal of the third busbar is located in the axial direction between the first plane and the second plane.

10. The electric motor according to claim 1, wherein a distance between the first plane and the second plane provides electrical insulation between the three busbars.

* * * * *